(12) United States Patent
Pomaranski et al.

(10) Patent No.: US 7,428,655 B2
(45) Date of Patent: Sep. 23, 2008

(54) SMART CARD FOR HIGH-AVAILABILITY CLUSTERING

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 801 days.

(21) Appl. No.: 10/936,256

(22) Filed: Sep. 8, 2004

(65) Prior Publication Data

US 2006/0053330 A1    Mar. 9, 2006

(51) Int. Cl.
*G06F 11/00* (2006.01)

(52) U.S. Cl. .......................................................... 714/3
(58) Field of Classification Search ..................... 714/3, 714/31
See application file for complete search history.

(56) References Cited

U.S. PATENT DOCUMENTS

| | | | |
|---|---|---|---|
| 6,389,551 B1 | 5/2002 | Yount | |
| 6,609,213 B1 | 8/2003 | Nguyen et al. | |
| 6,697,973 B1 | 2/2004 | Baumeister, IV et al. | |
| 6,728,781 B1 | 4/2004 | Aguilera et al. | |
| 2002/0169867 A1* | 11/2002 | Mann et al. | 709/224 |
| 2003/0041046 A1* | 2/2003 | Allison et al. | 707/1 |
| 2005/0021628 A1* | 1/2005 | Johansson | 709/205 |
| 2005/0080895 A1* | 4/2005 | Cook et al. | 709/224 |

FOREIGN PATENT DOCUMENTS

| | | |
|---|---|---|
| GB | 2410405 A | 7/2005 |
| WO | WO 98/59288 A1 | 12/1998 |

OTHER PUBLICATIONS

Google search for definition of "smart card". Retrieved from the Internet. Jan. 11, 2008.*
Patent Act 1977: Search Report under Section 17 for Application No. GB0516363.9.

* cited by examiner

*Primary Examiner*—Scott T. Baderman
*Assistant Examiner*—Paul F Contino

(57) ABSTRACT

One embodiment disclosed relates to a high-availability (HA) cluster system. The cluster includes a plurality of computing nodes and clustering software configured to manage the cluster. In addition, the cluster includes a smart card, including a microprocessor-based system, communicatively connected to each of the nodes. Another embodiment disclosed relates to an apparatus adapted for use with a corresponding node of a high-availability (HA) cluster. The apparatus includes a microprocessor, control software, at least one input channel to receive data from the corresponding node, at least one output channel to send commands to the corresponding node, at least one input link to receive commands from clustering software of the HA cluster, and at least one output link to send information to the clustering software. Other embodiments are also disclosed.

24 Claims, 7 Drawing Sheets

Processing Ethernet signal

Processing chassis code stream

Monitoring error/system log

Processing inputs from cluster

Cluster Level Algorithm

SMART CARD FOR HIGH-AVAILABILITY CLUSTERING

CROSS-REFERENCE TO RELATED APPLICATIONS

The present application is related to U.S. patent application Ser. No. 10/764,165, entitled "Cluster Node Status Detection and Communication," filed Jan. 23, 2004 by inventors Ken G. Pomaranski and Andrew H. Barr. The present application is also related to U.S. patent application Ser. No. 10/764,198, entitled "Multi-State Status Reporting for High-Availability Cluster Nodes," filed Jan. 23, 2004 by inventors Ken G. Pomaranski and Andrew H. Barr and to U.S. patent application Ser. No. 10/764,244, entitled "Node Management in High-Availability Cluster," filed Jan. 23, 2004 by inventors Ken G. Pomaranski and Andrew H. Barr. Each of the above three patent applications are hereby incorporated by reference.

BACKGROUND

1. Field of the Invention

The present disclosure relates generally to computer networks. More particularly, the present disclosure relates to clusters of interconnected computer systems.

2. Description of the Background Art

A cluster is a parallel or distributed system that comprises a collection of interconnected computer systems or servers that is used as a single, unified computing unit. Members of a cluster are referred to as nodes or systems. The cluster service is the collection of software on each node that manages cluster-related activity.

Clustering may be used for parallel processing or parallel computing to simultaneously use two or more processors to execute an application or program. Clustering is a popular strategy for implementing parallel. processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server.

It is desirable to improve apparatus and methods for high-availability (HA) clusters. It is particularly desirable to make HA clusters more robust and increase uptime for such clusters.

SUMMARY

One embodiment of the invention relates to a high-availability (HA) cluster system. The cluster includes a plurality of computing nodes and clustering software configured to manage the cluster. In addition, the cluster includes a smart card, including a microprocessor-based system, communicatively connected to each of the nodes.

Another embodiment relates to an apparatus adapted for use with a corresponding node of a high-availability (HA) cluster. The apparatus includes a microprocessor, control software, at least one input channel to receive data from the corresponding node, at least one output channel to send commands to the corresponding node, at least one input link to receive commands from clustering software of the HA cluster, and at least one output link to send information to the clustering software.

Another embodiment relates to a method of identifying and handling a down state of a node of a high-availability cluster. The method includes both checking for transmission of a first heartbeat signal from the node and checking for transmission of a second heartbeat signal from a smart card for the node.

Other embodiments are also disclosed.

DETAILED DESCRIPTION

The efficiency or uptime of a high-availability (HA) cluster is largely influenced by the amount of time it takes to recognize that a node in the cluster is in a "down" state (where it ceases performing useful computing or storage functions for the cluster). Once the clustering software determines that a node is "down", the clustering software may perform the necessary tasks to keep the rest of the cluster running, with little interruption to user tasks.

Unfortunately, it often takes a relatively long time for a node to determine and report its system status to the HA cluster and clustering software. Reasons for the slowness of the determination and reporting of a down node in a conventional cluster include the following. First, the node itself is typically not in the best position to diagnose its own status. Second, the operating system used is typically not designed specifically for multi-node, HA cluster use. Third, input/output (I/O) cards (for example, network cards) used in clustering are typically "off the shelf" cards and are not configured or tuned for use in signaling in a high-availability environment. Fourth, a node can sometimes signal a false failure of itself, then come back, confusing or messing up the HA cluster and clustering software. Reasons for false failure signals include that Ethernet disconnects and heartbeat misses (typical signals of a bad node) are not reliable enough for many mission critical environments.

Another large influence on efficiency or uptime is the time it takes to perform a switchover after a failed node is discovered. A controlled or expected switchover is much more efficient than an unexpected switchover. This is because it is much easier to move applications off of a running node, than a node that has "disappeared" from the HA cluster.

The present invention endeavors to make HA clusters more robust by using smart cards with nodes in an HA cluster. The smart cards have functions that assist in the HA cluster management of the nodes. One advantageous aspect of using such a smart card in correspondence with each node is that the smart card may function as an independent system to quickly and accurately determine and communicate the correct status of the corresponding node. In addition, the smart card may be configured to quickly take or initiate corrective action to maximize the uptime of the cluster.

In order to prevent the smart card from being a point of failure for the cluster, the HA cluster and clustering software may be advantageously configured to "ignore" a down or absent smart card. In the event of a down or missing smart card, the cluster may revert to conventional methods for management of the corresponding node.

Figure 1:
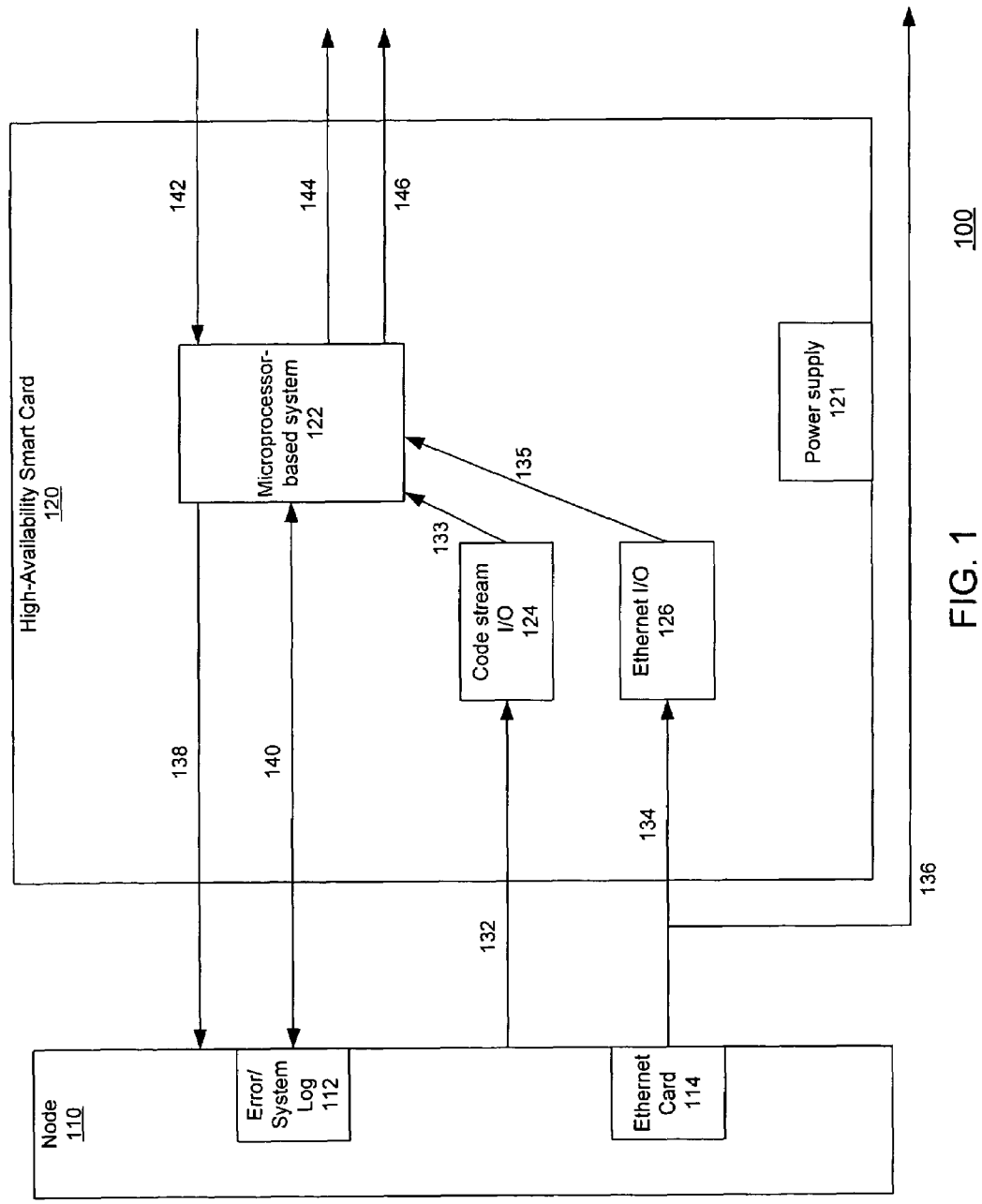
FIG. 1 is a schematic diagram of a smart card for a node of a high-availability cluster in accordance with an embodiment of the invention.

FIG. 1 is a schematic diagram of a smart card 120 for a node 110 of a high-availability cluster in accordance with an embodiment of the invention. The smart card 120 is coupled to and utilized in cooperation with a particular corresponding node 110 of the multi-node high-availability cluster.

In accordance with an embodiment of the invention, the smart card 120 includes at least a micro-processor based system 122, a code stream input/output (I/O) unit 124, and a network I/O unit 126. The smart card 120 may also advantageously include its own power supply 121 such that it may operate independent from power at the node 110.

The code stream I/O unit 124 may be configured to capture or to "snoop" a chassis code stream 132 from the corresponding node 110. The chassis code stream is then communicated 133 to the microprocessor-based system 122 controlling the smart card 120. In one embodiment, the chassis code stream includes data relating to the operational "health" of the corresponding node 110.

The network I/O unit 126 may be configured to view or "snoop" an Ethernet or other network output 134 from the corresponding node 110. The network output is then communicated 135 to the microprocessor-based system 122 controlling the smart card 120. The network output is also transmitted 136 to the network mesh or network medium (such as an Ethernet network) that interconnects the nodes of the cluster. In one embodiment, the network output may include a node heartbeat signal which indicates that the node is up and running (if the heartbeat is present) or down and not functioning properly (if the heartbeat is absent).

The microprocessor-based system 122 is configured to control the smart card operations. The microprocessor-based system 122 may be configured with a microcontroller, non-volatile memory, and volatile memory.

The microprocessor-based system 122 is further configured to communicate information with the corresponding node 110. For example, a reset command may be communicated via a command line 138. In addition, the microprocessor-based system 122 may be configured to receive and write data to the corresponding node 110. For example, error/system log information may be retrieved by way of an interface 140 to an error/system log 112 stored at the node 110.

The microprocessor-based system 122 is further configured to communicate information with the rest of the cluster. For example, the microprocessor-based system 122 may be configured to receive instructions or commands for that smart card 120 from the cluster by way of a communication link 142 (that may be implemented, for example, by way of an Ethernet connection). The microprocessor-based system 122 may also be configured to transmit a node status signal via a status link 144 and a heartbeat signal via a heartbeat output line 146.

In one embodiment disclosed herein, the microprocessor-based system 122 may be configured to perform various tasks, such as the following:

a. monitoring the network output, including node heartbeat signal, from the corresponding node (received via 135);
b. reading, storing, and analyzing the chassis code output from the corresponding node (read via 133);
c. reading, storing, and analyzing error/system log data from the corresponding node (read via 140);
d. resetting or rebooting the corresponding node if a problem is seen (reset command sent via command line 138);
e. resetting or rebooting the corresponding node if instructed by the cluster-level software (cluster instruction sent via 142);
f. sending a node status signal (for example, indicating GOOD, BAD, or DEGRADED states) to the cluster (sent via 144);
g. sending its own (smart card) heartbeat signal to the cluster (sent via 146);
h. upon determining that the corresponding node is going bad, initiating a switchover by requesting movement of applications from the node and then shutting down the node, or by just quickly shutting down the corresponding node by way of a reset (commands sent via line 138); and
i. upon receiving a command from the cluster software to test the corresponding node (or upon otherwise determining a need to test the node, such as determining that the node is "sick" based on the chassis code stream), removing the node from use, running node level diagnostics, and reporting results.

Figure 2:
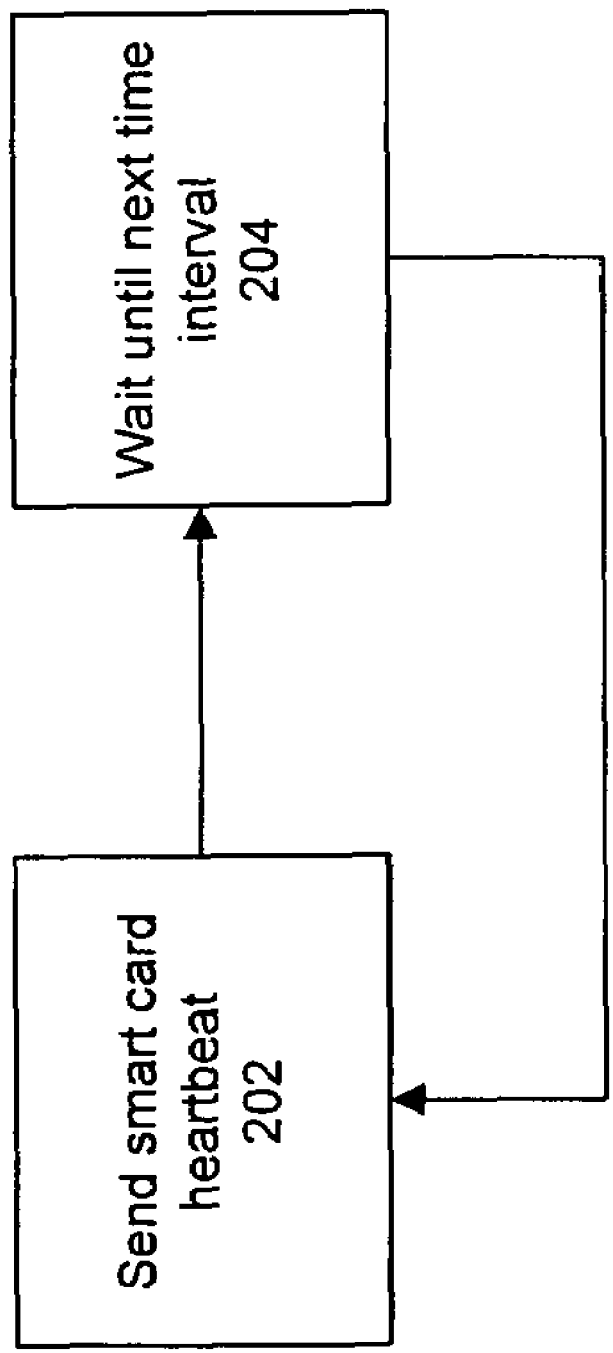
FIG. 2 is a flow chart depicting a loop procedure for transmitting a heartbeat signal from a smart card in accordance with an embodiment of the invention.

FIG. 2 is a flow chart depicting a loop procedure (200) for transmitting a heartbeat signal 146 from a smart card 120 in accordance with an embodiment of the invention. The procedure (200) simply sends (202) the heartbeat signal from the smart card every period or time interval (204). The smart card heartbeat signal indicates that the smart card is functioning, at least on a basic level.

Figure 3:
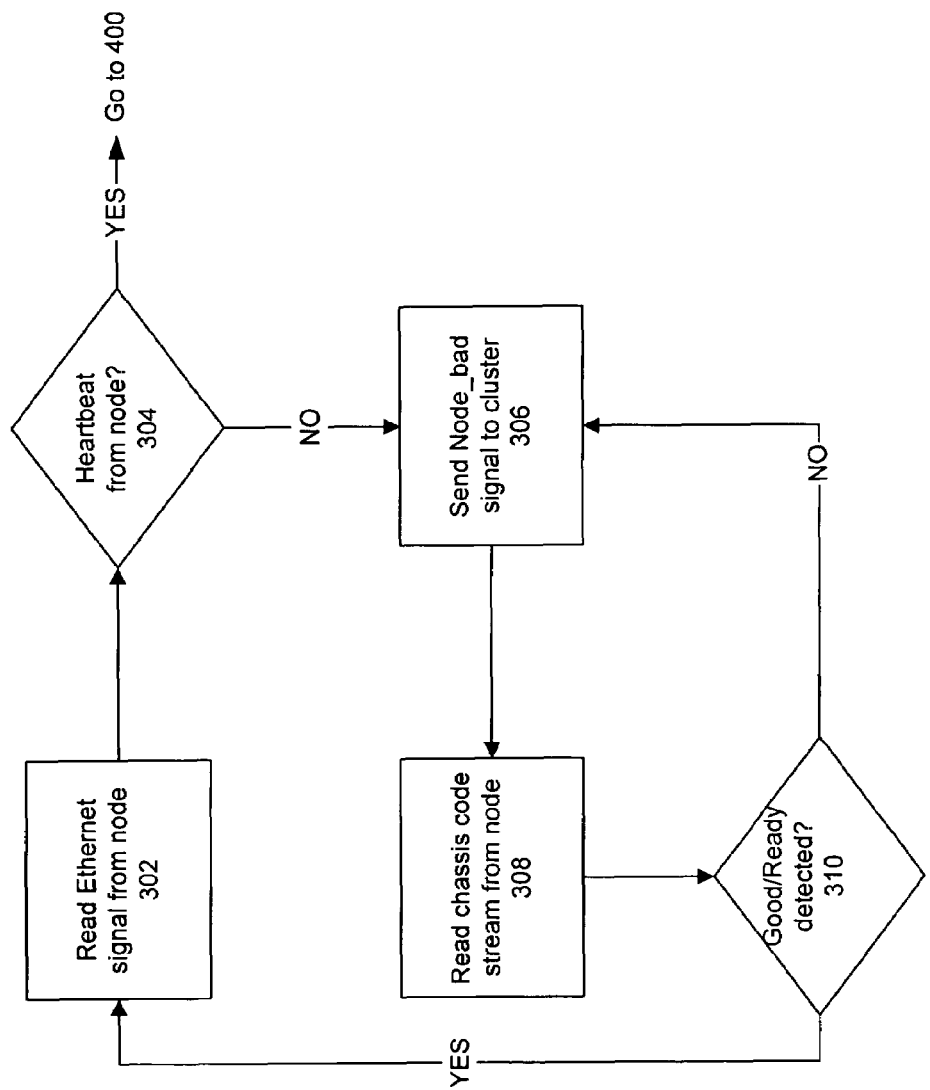
FIG. 3 is a flow chart depicting a procedure for processing an Ethernet signal from a node by a smart card in accordance with an embodiment of the invention.

FIG. 3 is a flow chart depicting a procedure (300) for processing an Ethernet (or other network) signal 134 from a node 110 by a smart card 120 in accordance with an embodiment of the invention. The Ethernet (or other network) signal 134 is read (302) from the node 110, and a determination (304) is made as to whether the signal read includes a heartbeat signal from the node. If a heartbeat is found, then the smart card 120 may move on to a procedure (400) for processing a chassis code stream. This procedure (400) is discussed below in relation to FIG. 4.

On the other hand, if a heartbeat is not found, then a Node_bad signal (as opposed to a Node_good signal or a Node degraded signal) may be sent (306) to the cluster. This Node_bad signal indicates that the node heartbeat is down and may be sent, for example, via link 144 of FIG. 1. Thereafter, the procedure (300) goes into a loop (306, 308, 310) until the node 110 appears to be good and ready from the chassis code stream. In the loop, the chassis code stream is read (308). If a good/ready signal is not found (310), then the Node_bad signal is continued to be sent (306). Once a good/ready signal is found in the chassis code stream (310); then the smart card 120 goes back and reads (302) the network signal so as to look for the node heartbeat (304).

Figure 4:
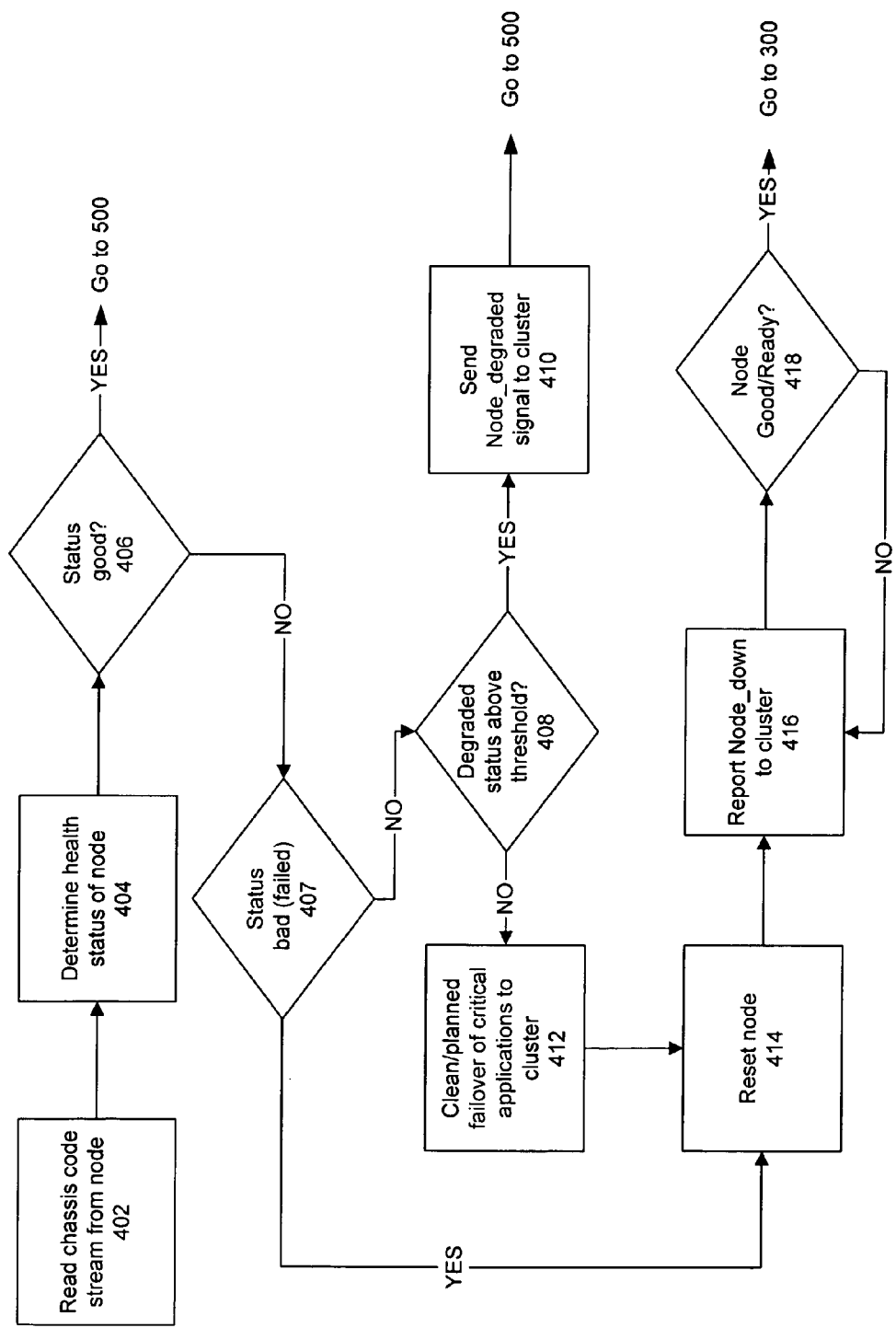
FIG. 4 is a flow chart depicting a procedure for processing a chassis code stream from a node by a smart card in accordance with an embodiment of the invention.

FIG. 4 is a flow chart depicting a procedure (400) for processing a chassis code stream from a node 110 by a smart card 120 in accordance with an embodiment of the invention. The chassis code stream 133 is read (402) from the node 110, and a determination (404) is made based on the code stream as to the health status of the node.

If it is determined from the code stream that the health status is indicated to be good (406), then the smart card 120 may move on to a procedure (500) for monitoring an error/system log for the node 110. This procedure (500) is discussed below in relation to FIG. 5.

If it is determined from the code stream that the health status is indicated to be bad (i.e. the node has failed) (407), then the smart card 120 may be configured to reset (414) the node 110. The smart card 120 may be configured to then report (416) to the cluster that the node is down, until the smart card determines (418) from the chassis code stream that the node is good and ready. Thereafter, the smart card 120 may go back to the procedure (300) for processing the network signal from the node 110, as discussed above in relation to FIG. 3.

In accordance with an embodiment of the invention, if the health status from the code stream is not indicated to be either good or bad (failed), then the health status is degraded, at least on some level. A determination (408) is made as to whether the degraded status is above a threshold level. The threshold level may be set so as to differentiate between those degradations severe enough to merit initiation of a failover procedure and those not severe enough to merit a failover.

If the degraded status is above the threshold level (no failover needed), then a Node_degraded signal is generated and sent (410) to the cluster. Thereafter, the smart card 120 may move on to the procedure (500) for monitoring the error/system log for the node 110, as discussed below in relation to FIG. 5.

On the other hand, if the degraded status is below the threshold level (failover needed), then the smart card 120 initiates a clean or planned failover (412) wherein critical applications on the node 110 are moved to one or more other nodes of the cluster. Thereafter, the smart card 120 may reset (414) the node 110. The smart card 120 may be configured to then report (416) to the cluster that the node is down, until the smart card determines (418) from the chassis code stream that the node is good and ready. Thereafter, the smart card 120 may go back to the procedure (300) for processing the network signal from the node 110, as discussed above in relation to FIG. 3.

Figure 5:
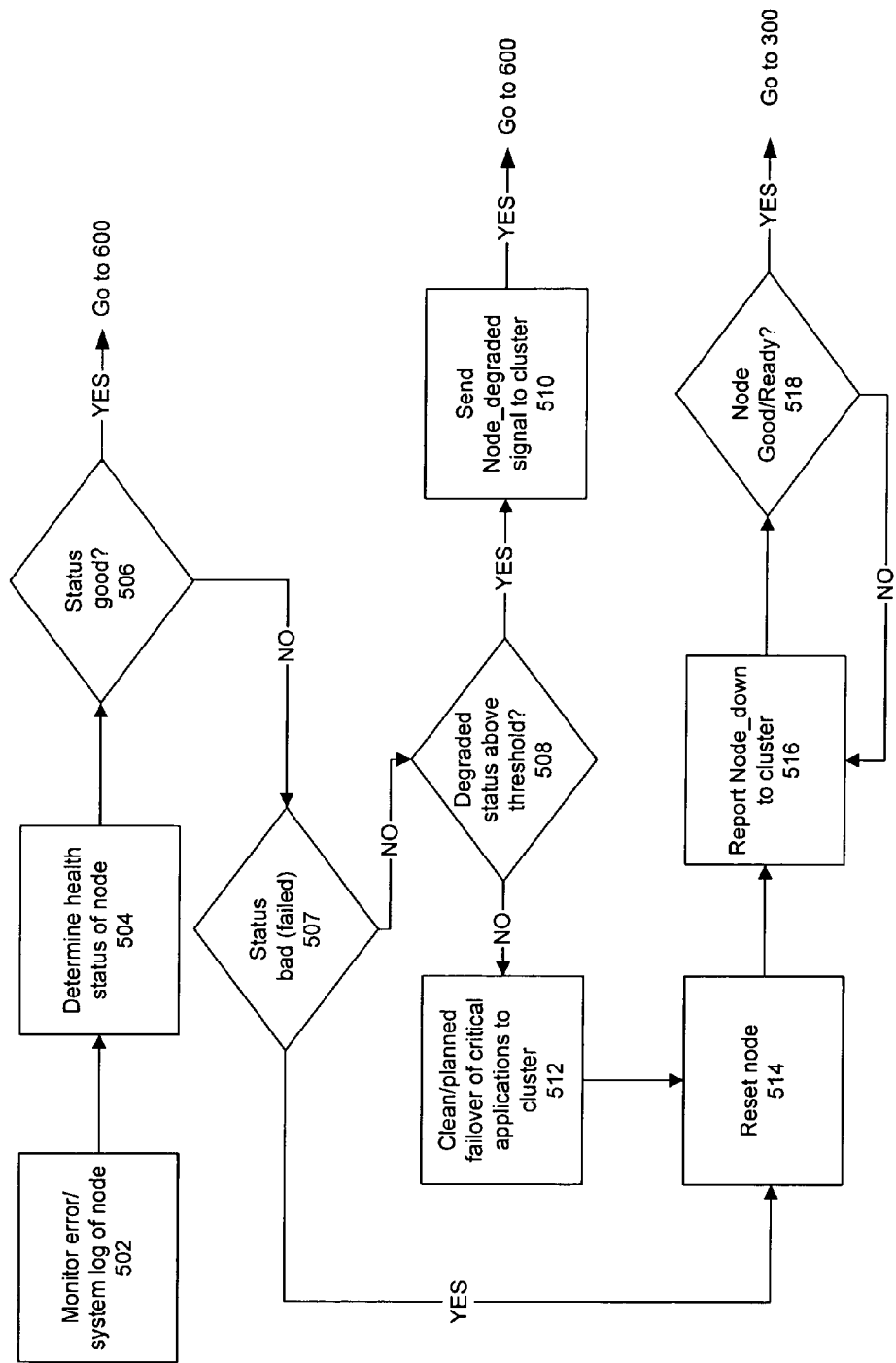
FIG. 5 is a flow chart depicting a procedure for monitoring an error/system log of a node by a smart card in accordance with an embodiment of the invention.

FIG. 5 is a flow chart depicting a procedure (500) for monitoring an error/system log 112 of a node 110 by a smart card 120 in accordance with an embodiment of the invention. The error/system log 112 is read (502) from the node 110, and a determination (504) is made based on the contents of the log 112 as to the health status of the node.

If it is determined from the log data that the health status is indicated to be good (506), then the smart card 120 may move on to a procedure (600) for processing inputs from the cluster. This procedure (600) is discussed below in relation to FIG. 6.

If it is determined from the log data that the health status is indicated to be bad (i.e. the node has failed) (507), then the smart card 120 may be configured to reset (514) the node 110. The smart card 120 may be configured to then report (516) to the cluster that the node is down, until the smart card determines (518) from the chassis code stream that the node is good and ready. Thereafter, the smart card 120 may go back to the procedure (300) for processing the network signal from the node 110, as discussed above in relation to FIG. 3.

In accordance with an embodiment of the invention, if the health status from the log data is not indicated to be either good or bad (failed), then the health status is degraded, at least on some level. A determination (508) is made as to whether the degraded status is above a threshold level. The threshold level may be set so as to differentiate between those degradations severe enough to merit initiation of a failover procedure and those not severe enough to merit a failover.

If the degraded status is above the threshold level (no failover needed), then a Node_degraded signal is generated and sent (510) to the cluster. Thereafter, the smart card 120 may move on to the procedure (600) for processing inputs from the cluster, as discussed below in relation to FIG. 6.

On the other hand, if the degraded status is below the threshold level (failover needed), then the smart card 120 initiates a clean or planned failover (412) wherein critical applications on the node 110 are moved to one or more other nodes of the cluster. Thereafter, the smart card 120 may reset (514) the node 110. The smart card 120 may be configured to then report (516) to the cluster that the node is down, until the smart card determines (518) from the chassis code stream that the node is good and ready. Thereafter, the smart card 120 may go back to the procedure (300) for processing the network signal from the node 110, as discussed above in relation to FIG. 3.

Figure 6:
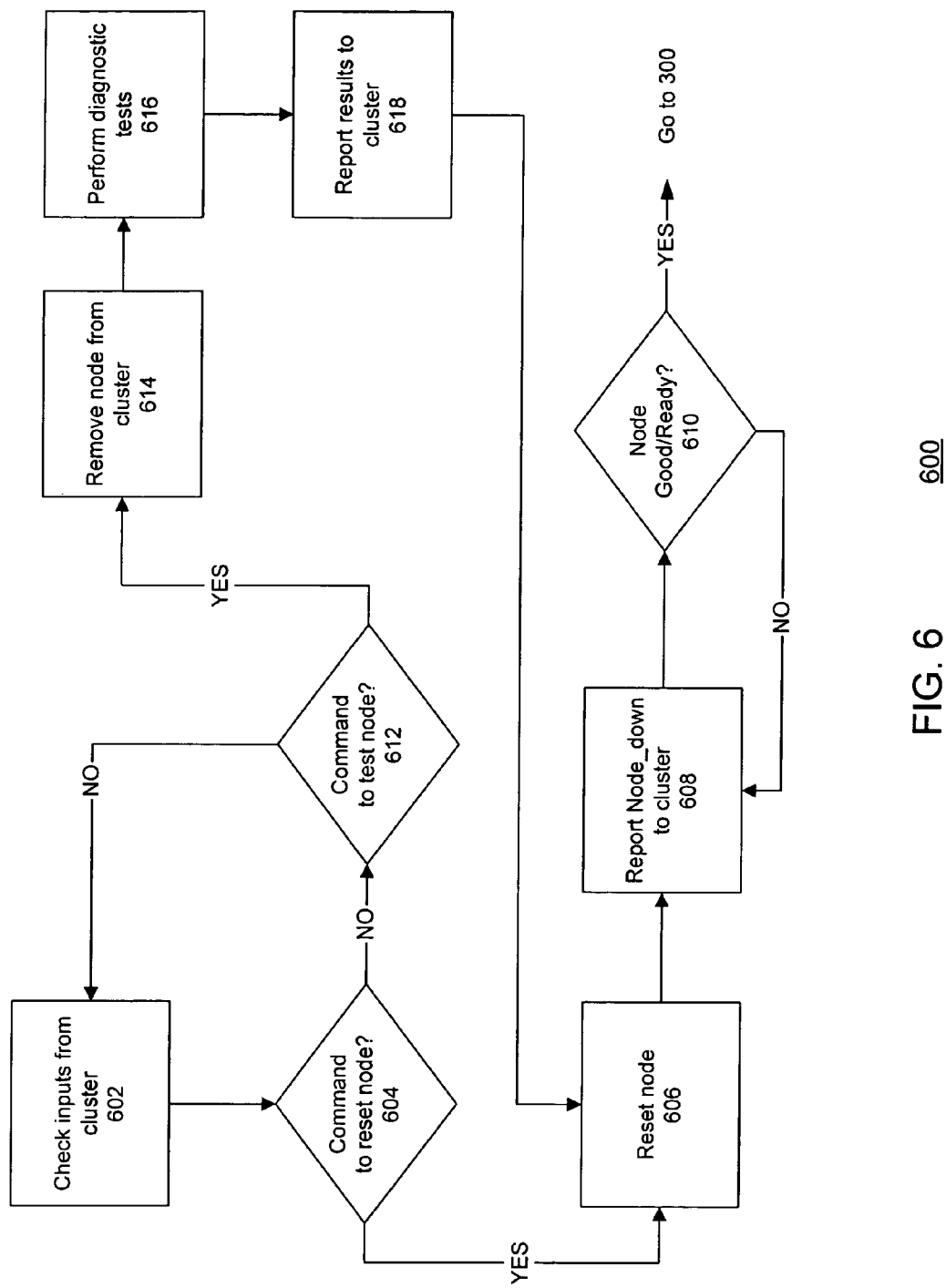
FIG. 6 is a flow chart depicting a procedure for processing commands from the cluster by a smart card in accordance with an embodiment of the invention.

FIG. 6 is a flow chart depicting a procedure (600) for processing commands from the cluster by a smart card 120 in accordance with an embodiment of the invention. The command inputs from the cluster are read (602) by the smart card 120.

If a command is received (604) from the cluster-level software to reset the node, then the smart card 120 may cause a reset (606) the node 110. The smart card 120 may be configured to then report (608) to the cluster that the node is down, until the smart card determines (610) from the chassis code stream that the node is good and ready. Thereafter, the smart card 120 may go back to the procedure (300) for processing the network signal from the node 110, as discussed above in relation to FIG. 3.

If a command is received to (606) from the cluster-level software to test the node 110, then the smart card 120 may proceed to remove (614) the node 110 from the cluster. This node removal (614) may involve performing a clean/planned failover of critical applications to another node or other nodes of the cluster. Diagnostic tests may then be performed (616) on the node 110, and the results of the tests reported (618) to the cluster-level software. Thereafter, the smart card 120 may cause a reset (606) the node 110. The smart card 120 may be configured to then report (608) to the cluster that the node is down, until the smart card determines (610) from the chassis code stream that the node is good and ready. Thereafter, the smart card 120 may go back to the procedure (300) for processing the network signal from the node 110, as discussed above in relation to FIG. 3.

While FIG. 6 depicts processing by a smart card 120 of reset and test commands from the cluster-level software, other commands may also be received from the cluster and processed by the smart card 120.

While FIGS. 2 through 6 depict one specific implementation of an algorithm for processing by a smart card 120, changes to that implementation may be made within the spirit and scope of the invention. For example, the implementation discussed above processes the chassis code stream per FIG. 4 and then processes the log data per FIG. 5. Another implementation with the same or similar functionality would process the log data and then process the chassis code stream.

Figure 7:
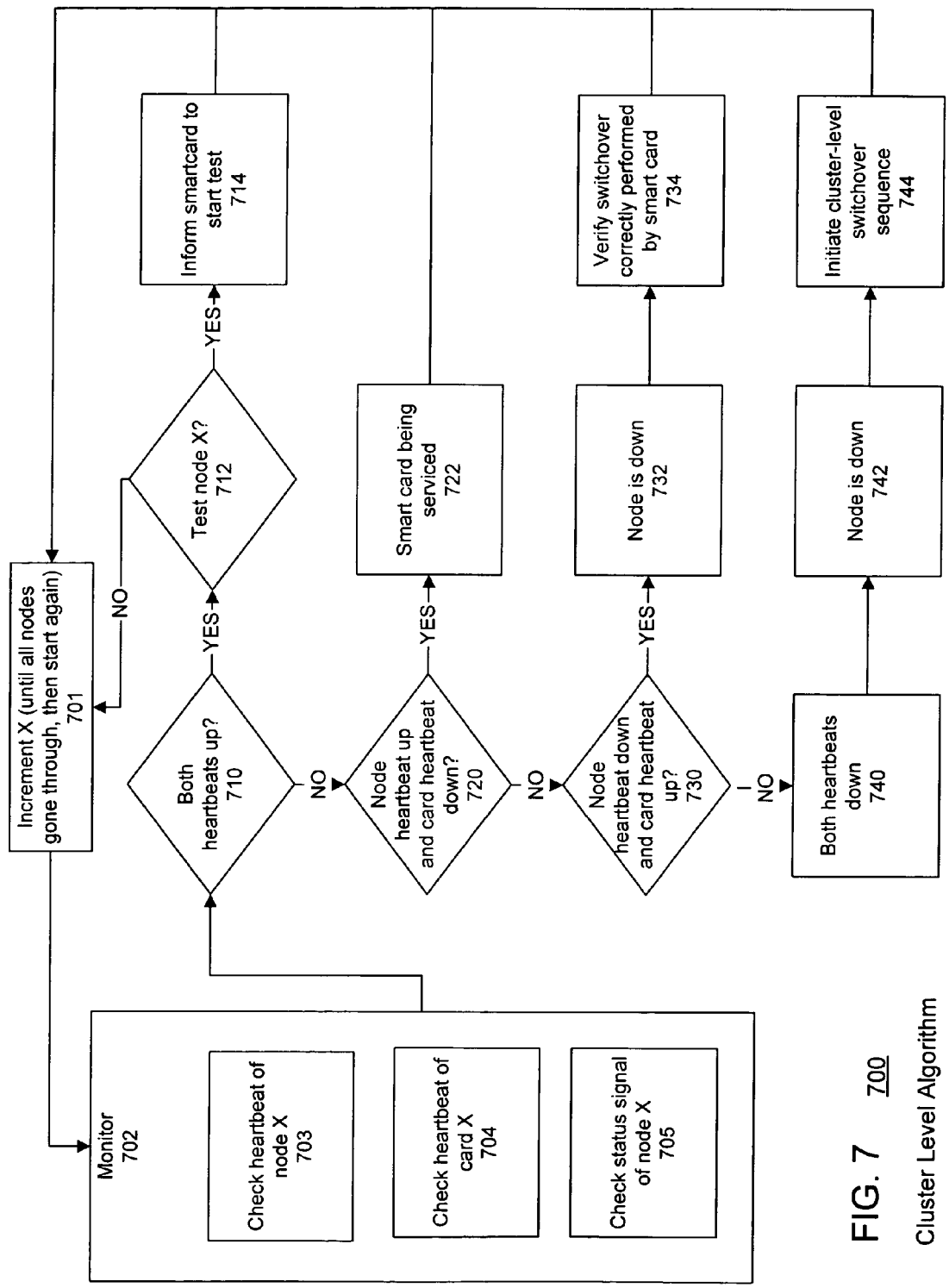
FIG. 7 is a flow chart depicting a cluster-level algorithm in accordance with an embodiment of the invention.

FIG. 7 is a flow chart depicting a cluster-level procedure (700) in accordance with an embodiment of the invention. The procedure (700) monitors various signals for each node in the cluster. In one implementation, the cluster-level software may perform a loop (701) through the nodes in the cluster (X=1 to nodes_in_cluster) and monitor the various signals from each node. In one embodiment, for each node X, the cluster-level software monitors (702) the node by checking (703) the heartbeat of the node, checking (704) the heartbeat of the corresponding card, and checking (705) the status signal of the node.

If both (node and card) heartbeats are up for node X (710), then a determination (712) is made as to whether to test that node. The determination to test may be triggered, for example, by having received a degraded status signal for that node, or may be triggered based on a time interval for periodic testing. If testing is to be performed on node X, then the cluster-level software sends (714) a command to the smart card for node X to start a test of that node. The loop (701) may then continue to the next node.

If the node heartbeat is up but the card heartbeat is down for node X (720), then that indicates the smart card is being serviced (722). No action need be taken, and the loop (701) may then continue to the next node. Advantageously, this part of the procedure (700) effectively separates a smart card failure from a node failure. If the smart card fails (or is being repaired or replaced), then the cluster-level software may revert to relying on the node heartbeat to indicate that the node is still operational. When the smart card comes back online, then the smart card may again be used to provide additional node status information.

If the card heartbeat is up but the node heartbeat is down for node X (730), then that indicates the node is down (732). However, the associated card is up, so the clustering software only needs to verify (734) that the smart card performed its switchover tasks correctly. The loop (701) may then continue to the next node.

Finally, if both (node and card) heartbeats are down for node X (740), then that indicates the node is down (742). In this case, the associated card is also down. Hence, the clustering software initiates (434) a cluster-level switchover sequence for the down node. The loop (701) may then continue to the next node.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A high-availability (HA) cluster system, the system comprising:
   a plurality of computing nodes of said cluster;
   clustering software configured to manage said cluster; and
   a smart card, including a microprocessor-based system, communicatively connected to each of the nodes,
   wherein each node is configured to transmit a first heartbeat type signal when the node is up, and wherein each smart card is configured to transmit second heartbeat type signal when the smart card is up,
   wherein the system is configured to check for transmission of both the first and second heartbeat type signals from each node, and
   wherein the system is further configured, such that, if the second heartbeat type signal is being transmitted from a node, but the first heartbeat signal is absent from the node, then verification is made as to whether a switchover sequence was performed by the smart card for the node.

2. The system of claim 1, wherein the smart card is further configured to read a network signal from a corresponding node to check for transmission of the first heartbeat type signal.

3. The system of claim 2, wherein the smart card is further configured such that if the first heartbeat type signal is not being transmitted from the corresponding node, then the smart card sends a signal to the clustering software that the node is down.

4. The system of claim 1, wherein the smart card is further configured to read a chassis code from a corresponding node to determine a health status of that node.

5. The system of claim 4, wherein the smart card is further configured such that if the health status indicates the corresponding node is down, then the smart card initiates a reset of that node.

6. The system of claim 4, wherein the smart card is further configured such that if the health status indicates the corresponding node is degraded below a threshold level, then the smart card initiates a planned failover of that node.

7. The system of claim 1, wherein the smart card is further configured to read a system log from a corresponding node to determine a health status of that node.

8. The system of claim 7, wherein the smart card is further configured such that, if the health status indicates the corresponding node is down, then the smart card initiates a reset of that node.

9. The system of claim 7, wherein the smart card is further configured such that, if the health status indicates the corresponding node is degraded below a threshold level, then the smart card initiates a planned failover of that node.

10. The system of claim 1, wherein the smart card is further configured to process commands from the clustering software.

11. The system of claim 10, wherein said commands include a node reset command.

12. The system of claim 10, wherein said commands include a node test command.

13. The system of claim 1, wherein if the first heartbeat type signal is being transmitted from a node, but the second heartbeat type signal is absent from a corresponding smart card to that node, then the clustering software assumes the node is up and does not initiate a switchover sequence.

14. An apparatus adapted for use with a corresponding node of a high-availability (HA) cluster, the apparatus comprising:
- a microprocessor and control software to control operation of the apparatus;
- at least one input channel to receive data from the corresponding node;
- at least one output channel to send commands to the corresponding node;
- at least one input link to receive commands from clustering software of the HA cluster; and
- at least one output link to send information to the clustering software,
- wherein the apparatus is configured to generate and transmit a secondary heartbeat signal when the apparatus is up and running,
- wherein the apparatus is configured to read a network signal from the corresponding node to check for transmission of a primary heartbeat signal, and
- wherein, if the primary heartbeat signal is down, the apparatus is configured to determine a health status of the corresponding node, and, if the health status indicates the corresponding node is degraded below a threshold level, then a planned failover is initiated which moves critical applications from the corresponding node to one or more other nodes of the cluster;
- wherein the apparatus is a smart card.

15. The apparatus of claim 14, wherein the apparatus is further configured such that if the primary heartbeat signal is not being transmitted from the corresponding node, then the apparatus sends a signal to the clustering software that the corresponding node is down.

16. The apparatus of claim 14, wherein the apparatus is configured to read a chassis code from the corresponding node to determine said health status.

17. The apparatus of claim 14, wherein the apparatus is configured to read a system log from a corresponding node to determine said health status.

18. The apparatus of claim 14, wherein the apparatus is further configured such that, if the health status indicates the corresponding node is down, then the apparatus initiates a reset of that node.

19. The apparatus of claim 14, wherein the apparatus is configured to process commands from the clustering software.

20. The apparatus of claim 19, wherein said commands include a reset command, and wherein the apparatus is further configured to initiate a reset of the corresponding node when the reset command is received.

21. The apparatus of claim 19, wherein said commands include a test command, and wherein the apparatus is further configured to initiate functional testing of the corresponding node when the test command is received.

22. A method of identifying and handling a down state of a node of a high-availability cluster, the method comprising:
- checking for transmission of a first heartbeat signal from the node; and
- checking for transmission of a second heartbeat signal from a smart card for the node,
- wherein if the second heartbeat signal is being transmitted, but the first heartbeat signal is absent, then verification is made as to whether a switchover sequence for the node was Performed by the smart card.

23. The method of claim 22, wherein if the first heartbeat signal is being transmitted, but the second heartbeat signal is absent, then the node is assumed to be up and no switchover sequence is initiated.

24. The method of claim 22, wherein if both the first and second heartbeat signals are absent, then initiating a cluster-level switchover sequence for the node.

\* \* \* \* \*

UNITED STATES PATENT AND TRADEMARK OFFICE
CERTIFICATE OF CORRECTION

PATENT NO. : 7,428,655 B2 Page 1 of 1
APPLICATION NO. : 10/936256
DATED : September 23, 2008
INVENTOR(S) : Ken Gary Pomaranski et al.

It is certified that error appears in the above-identified patent and that said Letters Patent is hereby corrected as shown below:

In column 10, line 29, in Claim 22, delete "Performed" and insert -- performed --, therefor.

Signed and Sealed this

Third Day of February, 2009

JOHN DOLL
*Acting Director of the United States Patent and Trademark Office*